June 23, 1959 W. W. DONEE 2,891,428
COMBINATION GUIDE AND GAUGE UNIT FOR PORTABLE DRILLS
Filed April 22, 1957 2 Sheets-Sheet 1
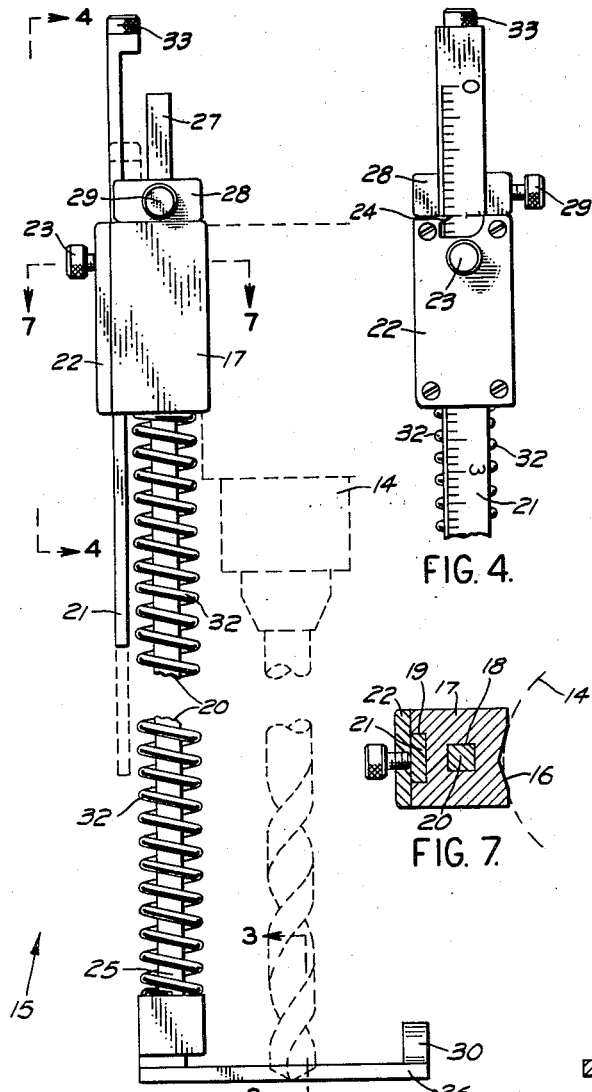
FIG. 1.
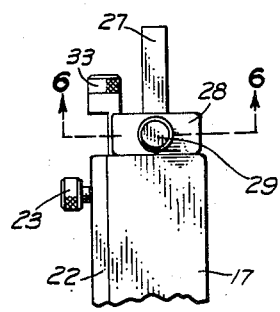
FIG. 4.
FIG. 5.
FIG. 6.
FIG. 7.
FIG. 8.
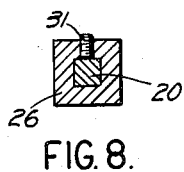
FIG. 3.
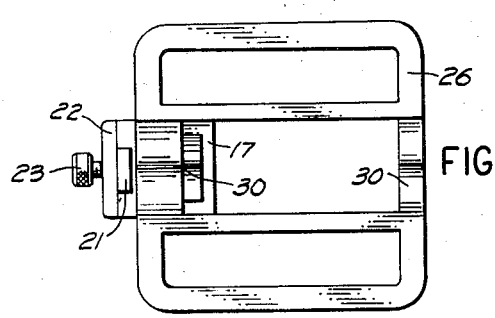
FIG. 2.
INVENTOR.
WILLIAM W. DONEE
BY R. W. Hodgson

United States Patent Office 2,891,428
Patented June 23, 1959

2,891,428

COMBINATION GUIDE AND GAUGE UNIT FOR PORTABLE DRILLS

William W. Donee, Venice, Calif., assignor of one-tenth to Gadget-Of-The-Month Club, Inc., Los Angeles, Calif., a corporation of California Application April 22, 1957, Serial No. 654,201

8 Claims. (Cl. 77—55)

Generally speaking, the present invention relates to the tool art and, more particularly, relates to a combination guide and gauge unit for portable drills.

The use of hand-guided portable drills presents an accuracy problem which somewhat hampers and greatly restricts the use of such devices in a number of important places. It is readily apparent that the use of portable drills is somewhat of a hit or miss proposition, especially to unskilled persons, and the use of portable drills on projects where accuracy is important is negligible. Normally the work piece will be marked off and will be drilled on a standard drill press thereby resulting in a loss of time and adding to the work load of the standard drill press. These portable drills were intended to take some of the work load off the standard drill press and cut transportation time by taking the drill to the work piece, rather than vice versa, and as a result many users unnecessarily sacrifice accuracy in order to cut their overall costs. This use of such methods leads to poorly constructed products and maintenance problems later on. Thus, a hole may be drilled too far, causing the piece to be scraped, or may not be drilled far enough, resulting in lost time in subsequent redrilling, or the desired angle may be distorted entirely, perhaps, resulting in scrapping or a revision of the entire plans. The use of portable drills by sighting entirely with the naked eye is obviously an unworkable solution to the accuracy problem. Many users take this problem into account when designing a product or constructing a building and make allowances for such; however, this is a poor approach to the problem and leads to sloppy construction and a poor finished product and to frequent subsequent repairs and replacements. Another important side effect of using a portable drill without a guide is the fact that many drill bits become broken and dull prematurely due to the careless and inaccurate use of such devices.

The present invention was developed primarily to overcome the aforementioned problems and, generally speaking, can be said to be, in one specific version, a drill guide and gauge unit for portable drills, comprising, a housing having a channel and a rabbet; a calibrated depth regulator that is slidably mounted within the rabbet; a retaining plate including a depth regulator adjusting screw, attached with respect to the rabbet, and which is cooperable for securing the depth regulator within the rabbet. A shaft which has a lower end and an upper end is slidably mounted within the channel and an open face-plate is attached with respect to the lower end of the shaft and with a slidable stop member being attached adjacent the upper end thereof. The face-plate is visually aligned and abuts the work surface and is mounted perpendicular to the shaft. Spring biasing means is mounted around the shaft and between the face-plate and the housing (although not so limited) and is cooperable for holding the face-plate against the work piece and cooperable for returning the face-plate into the original forward position, upon extraction of the portable drill from the work piece. The depth regulator has a projecting tab which is cooperable with the stop member for limiting travel of the housing down the shaft when the desired depth is reached.

In a modified version of the present invention, substantially as described above, the face-plate is adjustably mounted with respect to the shaft and has angular relationships marked thereon and also has an adjusting screw which is cooperable for maintaining the face-plate in the desired angular relationship. Thus, the portable drill can drill a hole at any angle with extreme accuracy.

In a further modified version of the present invention, substantially as described above, the face-plate is longitudinally adjustably mounted with respect to the shaft and is calibrated in terms of distance and has a right-angled flange at one end which is cooperable for maintaining a desired distance from the edge of a work piece.

From the above description of basic and generic forms of the present invention, it will be apparent to those skilled in the art that virtually all of the hereinbefore mentioned prior art problems and/or disadvantages are substantially entirely eliminated, met and/or overcome in and through use of the present invention.

For example, it is obvious that the present invention is portable and can be used with a wide variety of portable drills, and that, when mounted with respect to a portable drill, it is very firmly positioned with respect thereto in a manner which reduces set-up time and also virtually completely eliminates the likelihood of the portable drill becoming accidentally disengaged from the combination guide and gauge unit of the present invention.

With the above points in mind, it is an object of the present invention to provide a combination drill guide and gauge which will regulate the depth of a drilled hole.

Another object of the present invention is to provide a combination guide and gauge unit for portable drills which is cooperable for maintaining a desired angle relationship with a work piece.

A still further object of the present invention is to provide a combination drill guide and gauge for portable drills which is cooperable for maintaining a desired distance from the edge of a work piece.

It is a still further object of the present invention to provide a device of the character set forth in the preceding objects, which is inexpensive, simple, easy to operate and of virtually foolproof construction.

Other and allied objects will be apparent to those skilled in the art after a careful perusal, examination and study of the accompanying illustrations, the present specification, and the appended claims.

To facilitate understanding, reference will be made to the hereinbelow described figures, in which:

Fig. 1 is a side elevational view, partly broken away, with a portable drill and drill bit shown in phantom, and the depth regulator placed in a position that is cooperable for abutment with the stop member, shown in phantom, for regulating the depth of the drilled hole;

Fig. 2 is a bottom plan view of the present invention as shown in Fig. 1;

Fig. 3 is a fragmentary, partly sectional view, of the face-plate taken along the lines 3—3 in Fig. 1, and illustrating the downwardly directed V-shaped grooves of the face-plate;

Fig. 4 is a fragmentary front elevational view taken along the lines 4—4 in Fig. 1 and showing the calibrated scale of the depth regulator;

Fig. 5 is a fragmentary side elevational view, similar to the view shown in Fig. 1, with the projecting tab of the depth regulator facing outward so as not to abut the stop member thus permitting free drilling to any depth when no depth regulation is desired;

Fig. 6 is a fragmentary sectional view of the stop member taken along the lines 6—6 in Fig. 5;

Fig. 7 is a fragmentary sectional view taken along the lines 7—7 in Fig. 1 illustrating how the portable drill is positioned with respect to the housing of the present invention;

Fig. 8 is a fragmentary sectional view taken along the lines 8—8 in Fig. 3 illustrating the adjustable and removable mounting of the face-plate with respect to the shaft;

Figure 9:
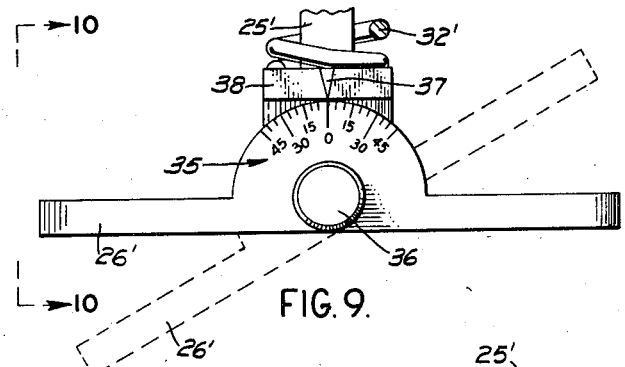
Fig. 9 is a fragmentary front view of a modified version of the adjustable face-plate which has various angles marked thereon and shows in phantom how the face-plate may be adjusted so as to obtain a hole drilled to a desired angle.

Generally speaking, the combination guide and gauge unit, indicated generally at 15 in Fig. 1, is adapted to be mounted with respect to a portable drill 14 so as to regulate the depth of the drilled hole, as best shown in Figs. 1 and 7. The portable drill 14 is mounted in contiguous contact with the partly recessed area 16 of the housing 17 and is generally secured to the housing 17 by means of a band strap (not shown since it is not a part of the present invention) or by the use of screws used in conjunction with tapped holes (not shown for drawing simplification reasons) in the housing 17 and the portable drill motor case.

The housing 17 has a channel 18 and a rabbet 19, with the channel 18 having a shaft 20 slidably mounted therein and with the rabbet 19 having a calibrated depth regulator 21 slidably mounted therein, as shown in Figs. 6 and 7. A retaining plate 22, attached with respect to the rabbet 19, includes an adjusting screw 23 and an index mark 24, secures the depth regulator within the rabbet 19, as shown in Figs. 1, 4, 5, and 7.

The shaft 20 has a lower end 25, whereon a face-plate 26 is attached, and an upper end 27. Attached adjacent the upper end 27 is a slidable stop member 28 which includes an adjustment screw 29. The stop member 28 has a channel 40, wherein the upper end 27 of the shaft 20 is slidably mounted, and a rabbet 34, wherein the depth regulator 21 is slidably mounted, as best shown in Fig. 6. The open face-plate 26 permits visual alignment with the work piece and is cooperable for abutment thereon.

The face-plate 26 has, in the specific example illustrated in Figs. 1–3, downwardly directed V-shaped grooves 30, as best shown in Fig. 3, in the center thereof which are cooperable for positioning the face-plate 26 on curved work pieces. An adjusting screw 31, as shown in Fig. 8, is used to adjustably and removably mount the face-plate 26 and make it possible for modified face-plates 26 to be used with the guide and gauge unit 15.

Spring biasing means 32 which is mounted around the shaft 20 and between the housing 17 and the abutment plate 26, as best shown in Fig. 1, is cooperable for holding the plate 26 against the work piece as the portable drill 14 is advanced into the work and is cooperable for returning the open abutment plate 26 to its original position, upon extraction of the drill 14 from the work piece.

The ruled depth regulator 21 has a projecting tab member 33 which is cooperable with the stop member 28 for limiting travel of the housing 17 down the shaft 20 when the desired depth is reached, as shown by the broken lines of the regulator 21 in Fig. 1. When depth regulation is desired the tab 33 is faced inwardly, as shown in Fig. 1, so as to abut the stop member 28 when the desired depth is reached. When no depth regulation is needed the stop tab 33 is turned outwardly, as shown in Fig. 5, and the housing 17 is free to travel down the shaft 20 without any depth regulation since the rule 21 merely slides freely within the rabbet 34 of the stop member 28, as shown in Fig. 6.

Figure 10:
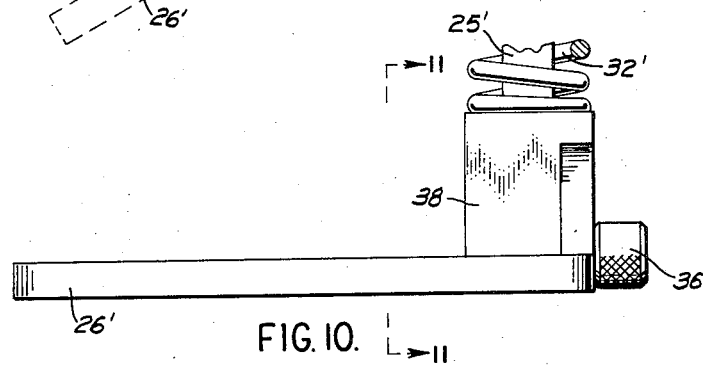
Fig. 10 is a fragmentary side view of the modified version of the present invention taken along the lines 10—10 in Fig. 9.
Figure 11:
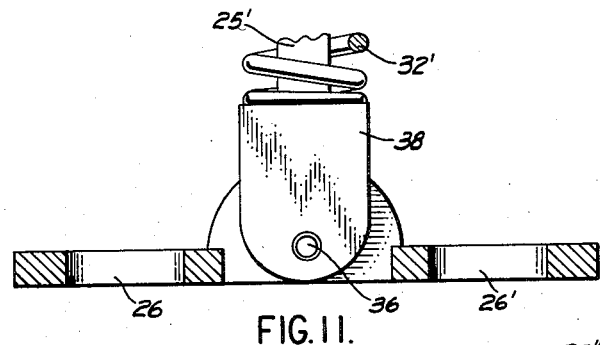
Fig. 11 is a fragmentary rear view of the modified version of the present invention taken along the lines 11—11 in Fig. 10.

Figs. 9–11 illustrate a modification of the present invention, and corresponding parts will be indicated by similar reference numerals, primed, however. The operation of this modified face-plate 26' is similar to the first form of the present invention, as shown in Figs. 1–3. In this connection, it should be noted that the face-plate 26' has angular relationships marked thereon, as indicated generally at 35 in Fig. 9, and has a locking screw 36 which is cooperable for maintaining the face-plate 26' in the desired angular relationship with respect to the work piece. The face-plate 26' is pivotally mounted about the adjusting screw 36. An index mark 37 is imprinted on the mounting base 38 of the face-plate 26' for indexing purposes.

Figure 12:
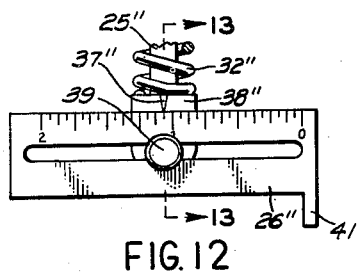
Fig. 12 is a fragmentary front view of a further embodiment of the present invention and shows a face-plate which is longitudinally adjustably mounted, is calibrated in distance, and has a right-angled flange which is cooperable for maintaining a desired distance from the edge of a work piece.
Figure 13:
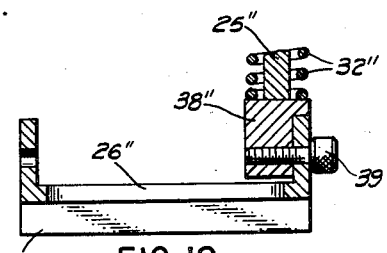
Fig. 13 is a fragmentary side sectional view of the modified version shown in Fig. 12 taken along the lines 13—13.

Figs. 12 and 13 illustrate another modification of the present invention, and corresponding parts will be indicated by similar reference numerals, double primed, however. The operation of this modified face-plate 26" is similar to the first and second forms of the present invention, as shown in Figs. 1–3, and 9–11. In this version the abutment plate 26" is longitudinally adjustably mounted with respect to the shaft by means of a locking screw 39, is calibrated in distance, and has a right-angled flange 41 which is cooperable for maintaining a desired distance from the edge of a work piece.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed.

For example, it is obvious that the various face plates of the present invention may be jointly combined to do a variety of functions. Also the lock member and the housing may be modified substantially. The projecting tab of the depth regulator may also be pivotally mounted and need not be integral therewith.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the appended claims, with due consideration for the doctrine of equivalents.

I claim:

1. Drill guide and gauge unit for portable drills, comprising: a housing having a channel and a rabbet and which is cooperable for removable attachment with respect to a portable drill; a calibrated depth regulator slidably mounted within said rabbet; a retaining plate including a depth regulator adjusting screw cooperable for securing said depth regulator within said rabbet; a shaft having a lower end, an upper end and being slidably mounted within said channel; a face-plate, attached with respect to the lower end of said shaft, cooperable with respect to a work piece, said face-plate being mounted perpendicular to said shaft; spring biasing means mounted between said face-plate and said housing, said spring biasing means being cooperable for holding said face-plate against the work piece and being cooperable for returning said face-plate into the original forward position, upon extraction of the portable drill from the work piece, a slidable stop member attached adjacent the upper end of said shaft; said depth regulator having a projecting tab; said projecting tab being cooperable for abutting said stop member when the desired depth is reached.

2. Drill guide and gauge unit for portable drills, comprising: a housing having a channel and a rabbet and which is cooperable for removable attachment with respect to a portable drill; a calibrated depth regulator slidably mounted within said rabbet; a retaining plate, attached with respect to said rabbet, including an index mark, a depth regulator adjusting screw and cooperable for securing said depth regulator within said rabbet; a shaft having a lower end, an upper end and being slidably mounted within said channel, said shaft being parallel to the drill bit mounted in the portable drill; an open face-plate, attached with respect to the lower end of said shaft, cooperable for abutment with respect to a work piece, said face-plate having downwardly directed V-shaped grooves which are cooperable for aligning said face-plate with curved work pieces, said face-plate being mounted perpendicular to said shaft; spring biasing means mounted around said shaft and between said face-plate and said housing, said spring biasing means being cooperable for holding said face-plate against the work piece as the portable drill is advanced into the work and being cooperable for returning said face-plate to its original position, upon extraction of the portable drill from the workpiece; a slidable stop member including an adjustment screw and which is attached adjacent the upper end of said shaft; said depth regulator having a projecting tab which is cooperable with said stop member for regulating the depth of a drilled hole.

3. Drill guide and gauge unit for portable drills cooperable for maintaining a desired angle relationship and cooperable for regulating the depth of a drilled hole, comprising: a housing having a channel and a rabbet and which is cooperable for removable attachment with respect to a portable drill; a calibrated depth regulator slidably mounted within said rabbet; a shaft having a lower end, an upper end and being slidably mounted within said channel; a face-plate, attached with respect to the lower end of said shaft, cooperable for abutment with respect to a work piece, said face-plate being adjustably mounted with respect to said shaft, spring biasing means mounted between said face-plate and said housing; a slidable stop member attached adjacent the upper end of said shaft; said depth regulator having a projecting tab; said projecting tab being cooperable for abutting said stop member when the desired depth is reached.

4. Drill guide and gauge unit for portable drills cooperable for maintaining a desired angle relationship and cooperable for regulating the depth of the drilled hole, comprising: a housing having a channel and a rabbet and which is cooperable for removable attachment with respect to a portable drill; a calibrated depth regulator slidably mounted within said rabbet; a retaining plate including a depth regulator adjusting screw cooperable for securing said depth regulator within said rabbet; a shaft having a lower end, an upper end and being slidably mounted within said channel; an open face-plate, attached with respect to the lower end of said shaft, cooperable for abutment with respect to a work piece, said face-plate being adjustably mounted with respect to said shaft and angular relationships marked thereon and an adjusting screw which is cooperable for maintaining said face-plate in the desired angular relationship; spring biasing means mounted around said shaft and between said face-plate and said housing, said spring biasing means being cooperable for holding said face-plate against the work piece and being cooperable for returning said face-plate into the original forward position, upon extraction of the portable drill from the work piece; a slidable stop member including an adjustment screw and which is attached adjacent the upper end of said shaft; said depth regulator having a projecting tab which is cooperable with said stop member for regulating the depth of a drilled hole.

5. Drill guide and gauge unit for portable drills cooperable for maintaining a desired angle relationship and cooperable for regulating the depth of a drilled hole, comprising: a housing having a channel and a rabbet and which is cooperable for removable attachment with respect to a portable drill; a calibrated depth regulator slidably mounted within said rabbet; a retaining plate, attached with respect to said rabbet, including a depth regulator adjusting screw and cooperable for securing said depth regulator within said rabbet; a shaft having a lower end, an upper end and being slidably mounted within said channel, said shaft being parallel to the drill bit mounted in the portable drill, an open face-plate, attached with respect to the lower end of said shaft, cooperable for abutment with respect to a work piece, said face-plate having downwardly directed V-shaped grooves in the center thereof which are cooperable for aligning said face-plate with curved work pieces, said face-plate being adjustably mounted with respect to said shaft and having angular relationships marked thereon and an adjusting screw which is cooperable for maintaining said face-plate in the desired angular relationship, said face-plate being mounted perpendicular to said shaft; spring biasing means mounted around said shaft and between said face-plate and said housing, said spring biasing means being cooperable for holding said face-plate against the work piece as the portable drill is advanced into the work and being cooperable for returning said face-place to its original position, upon extraction of the portable drill from the work piece; a slidable stop member including an adjustment screw and which is attached adjacent the upper end of said shaft; said depth regulator having a projecting tab which is cooperable with said stop member for limiting travel of said shaft when the desired depth is reached.

6. Drill guide and gauge unit for portable drills cooperable for maintaining a desired angle relationship and cooperable for regulating the depth of a drilled hole, comprising: a housing having a channel and a rabbet and which is cooperable for removable attachment with respect to a portable drill; a calibrated depth regulator slidably mounted within said rabbet; a shaft having a lower end, an upper end and being slidably mounted within said channel; a face-plate, attached with respect to the lower end of said shaft, cooperable for abutment with respect to a work piece, said face-plate being adjustably mounted with respect to said shaft and having a right-angled flange which is cooperable for maintaining a desired distance from the edge of a work piece; spring biasing means mounted between said face-plate and said housing; a slidable stop member attached adjacent the upper end of said shaft; said depth regulator having a projecting tab; said projecting tab being cooperable for abutting said stop member when the desired depth is reached.

7. Drill guide and gauge unit for portable drills cooperable for maintaining a desired angle relationship and cooperable for regulating the depth of a drilled hole, comprising: a housing having a channel and a rabbet and which is cooperable for removable attachment with respect to a portable drill; a calibrated depth regulator slidably mounted within said rabbet; a retaining plate including a depth regulator adjusting screw cooperable for securing said depth regulator within said rabbet; a shaft having a lower end, an upper end and being slidably mounted within said channel; an open face-plate, attached with respect to the lower end of said shaft, cooperable for abutment with respect to a work piece, said face-plate being longitudinally adjustably mounted with respect to said shaft and being calibrated in terms of distance and having a right-angled flange at one end which is cooperable for maintaining a desired distance from the edge of a work piece; spring biasing means mounted around said shaft and between said face-plate and said housing, said spring biasing means being cooperable for holding said face-plate against the work piece and being cooperable for returning said face-plate into the original forward position, upon extraction of the portable drill from the work piece; a slidable stop member including an adjustment screw and which is attached adjacent the upper end of said shaft; said depth regulator having a projecting tab which is cooperable with said stop member for regulating the depth of a drilled hole.

8. Drill guide and gauge unit for portable drills cooperable for maintaining a desired angle relationship and cooperable for regulating the depth of a drilled hole, comprising: a housing having a channel and a rabbet and which is cooperable for removable attachment with respect to a portable drill; a calibrated depth regulator slidably mounted within said rabbet; a retaining plate, attached with respect to said rabbet, including a depth regulator adjusting screw and cooperable for securing said depth regulator within said rabbet; a shaft having a lower end, an upper end and being slidably mounted within said channel, said shaft being parallel to the drill bit mounted in the portable drill; an open face-plate, attached with respect to the lower end of said shaft, cooperable for abutment with respect to a work piece, said face-plate having downwardly directed V-shaped grooves in the center thereof which are cooperable for aligning said face-plate with curved work pieces, said face-plate being mounted perpendicular to said shaft, said face-plate being longitudinally adjustably mounted with respect to said shaft and being calibrated in terms of distance and having a right-angled flange at one end which is cooperable for maintaining a desired distance from the edge of a work piece; spring biasing means mounted around said shaft and between said face-plate and said housing, said spring biasing means being cooperable for holding said face-plate against the work piece as the portable drill is advanced into the work and being cooperable for returning said face-plate to its original position, upon extraction of the portable drill from the work piece; a slidable stop member including an adjustment screw and which is attached adjacent the upper end of said shaft; said depth regulator having a projecting tab which is cooperable with said stop member for limiting travel of said shaft when the desired depth is reached.

References Cited in the file of this patent

UNITED STATES PATENTS

| | | |
|---|---|---|
| 2,050,709 | Lopez | Apr. 11, 1936 |
| 2,426,124 | Skwierawski | Aug. 19, 1947 |
| 2,612,793 | Timpner | Oct. 7, 1952 |